United States Patent [19]

Masumoto et al.

[11] Patent Number: 4,952,664
[45] Date of Patent: Aug. 28, 1990

[54] PROCESS FOR PRODUCING WEATHER-RESISTANT POLYCARBONATE WITH TRIAZINE-IMIDE CHAIN TERMINATOR

[75] Inventors: Mitsuhiko Masumoto; Satoshi Kanayama, both of Osaka, Japan

[73] Assignee: Mitsubishi Gas Chemical Company, Inc., Tokyo, Japan

[21] Appl. No.: 307,703

[22] Filed: Feb. 8, 1989

[30] Foreign Application Priority Data

Feb. 8, 1988 [JP] Japan .................................. 63-025693

[51] Int. Cl.$^5$ ............................................ C08G 63/62
[52] U.S. Cl. .................................... 528/199; 528/196; 528/198
[58] Field of Search .................................. 528/199, 198

[56] References Cited

U.S. PATENT DOCUMENTS

| | | | |
|---|---|---|---|
| 3,133,045 | 5/1964 | Deanin et al. | 528/199 |
| 3,399,172 | 8/1968 | Jaquiss | 528/199 |
| 4,153,780 | 5/1979 | Narita et al. | 528/199 |

Primary Examiner—Harold D. Anderson
Attorney, Agent, or Firm—Sughrue, Mion, Zinn, Macpeak & Seas

[57] ABSTRACT

A process for producing a weather-resistant polycarbonate resin by solution polymerization, of at least one dihydric phenol and phosgene in which a compound represented by formula (I):

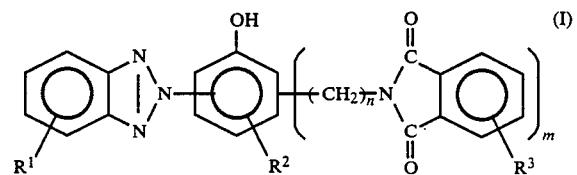

wherein $R^1$, $R^2$, and $R^3$, each represents a hydrogen atom, a halogen atom, a nitro group, an alkyl group having from 1 to 20 carbon atoms, an alkoxy group having from 1 to 20 carbon atoms, or an aryl group having from 6 to 20 carbon atoms; m represents 1 or 2; and n represents an integer of from 1 to 10, is used as a terminator. The polycarbonate resin produced exhibits high weather resistance without suffering from volatilization.

2 Claims, No Drawings

PROCESS FOR PRODUCING WEATHER-RESISTANT POLYCARBONATE WITH TRIAZINE-IMIDE CHAIN TERMINATOR

FIELD OF THE INVENTION

The present invention relates to a process for producing a polycarbonate resin having a novel terminal group. The polycarbonate resin obtained by this process has an excellent weather resistance due to a functional group having ultraviolet absorbability present at its terminal, and utilizing this property, can be suitably used in various purposes of use.

BACKGROUND OF THE INVENTION

Conventional polycarbonate resins are excellent in heat resistance and impact resistance, but are slightly insufficient in weather resistance. That is, they easily suffer from deterioration, such as a reduction in molecular weight or yellowing, when exposed to ultraviolet radiation. For this reason, a composition comprising a polycarbonate resin and a small amount of a ultraviolet absorber compounded thereto has been used.

However, in this case it has been difficult to maintain the amount of the ultraviolet absorber added at a constant value because the ultraviolet absorber added is lost through volatilization during extrusion or injection molding. In addition, the ultraviolet absorber added tends to cause contamination of a mold or deterioration of the working environment due to its volatility.

SUMMARY OF THE INVENTION

Accordingly, an object of the present invention is to provide a process for producing a weather-resistant polycarbonate resin without using a volatile ultraviolet absorber as an additive.

As a result of extensive investigations on a process for obtaining a weather-resistant polycarbonate resin which improves the above disadvantages, it has now been found that a weather-resistant polycarbonate resin having no volatility can be obtained by using a compound having a ultraviolet absorbability which has a benzotriazole group and a phthalimido group as a terminator or molecular weight modifier. The present invention has been accomplished by this finding.

The present invention relates to a process for producing a weather-resistant polycarbonate resin by solution polymerization, in which a compound represented by formula (I):

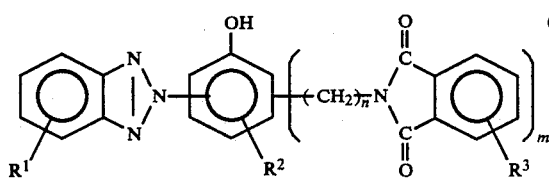

wherein $R^1$, $R^2$, and $R^3$, each represents a hydrogen atom, a halogen atom, a nitro group, an alkyl group having from 1 to 20 carbon atoms, an alkoxy group having from 1 to 20 carbon atoms, or an aryl group having from 6 to 20 carbon atoms; m represents 1 or 2; and n represents an integer of from 1 to 10, is used as a terminator.

DETAILED DESCRIPTION OF THE INVENTION

The process for producing a polycarbonate resin according to the present invention can be carried out by conventional techniques of solution polymerization known for the production of polycarbonate resins, such as interfacial polymerization and pyridine process, except for using the compound represented by formula (I) as a terminator.

In some detail, the interfacial polymerization process comprises reacting a dihydric phenol compound and phosgene in an organic solvent inert to the reaction in the presence of an alkali aqueous solution and then adding the terminator of the present invention and a polymerization catalyst, such as a tertiary amine and a quaternary ammonium salt, to effect polymerization. In this process, the terminator may be added during the reaction of the dihydric phenol compound and phosgene. The pyridine process comprises dissolving a dihydric phenol compound and the terminator of the present invention in pyridine or a mixed solvent of pyridine and an inert solvent and then blowing phosgene into the solution to directly produce a polycarbonate.

Preferred examples of the dihydric phenol compound used in the present invention include bis(4-hydroxyphenyl)methane, bis(4-hydroxyphenyl)ether, bis(4-hydroxyphenyl)sulfone, bis(4-hydroxyphenyl) sulfoxide, bis(4-hydroxyphenyl) sulfide, bis(4-hydroxyphenyl)ketone, 1,1bis-(4-hydroxyphenyl)cyclohexane, 2,2-bis(4-hydroxy-3,5-dibromophenyl)propane, 2,2-bis(4-hydroxy-3,5-dichlorophenyl)-propane, 2,2-bis(4-hydroxy-3-bromophenyl)propane, 2,2-bis(4-hydroxy-3-chlorophenyl)propane, 2,2-bis(4-hydroxy-3,5-dimethylphenyl)propane, 1,1-bis(4-hydroxyphenyl)-1-phenylethane, and bis(4-hydroxyphenyl)diphenylmethane.

The compound of formula (I) which can be used as a terminator can generally be synthesized by reacting a benzotriazole compound having a phenolic hydroxyl group and an alkylophthalimide compound. The compound of formula (I) can also be obtained by reacting a compound having an aminoalkyl group on an aromatic ring having a phenolic hydroxyl group [e.g., 2(2'-hydroxy-3'-aminoalkylphenyl)benzotriazole] with an acid anhydride (e.g., phthalic anhydride) to effect dehydrating condensation between the amino group and the acid anhydride group.

Specific examples of the benzotriazole compound having a phenolic hydroxyl group include 2(2'-hydroxy-5'methylphenyl)benzotriazole, 2(2'-hydroxy-4'-methylphenyl)benzotriazole, 2(2'-hydroxy-5'-t-butylphenyl)benzotriazole, 2(2'-hydroxyphenyl)benzotriazole, and 2(2'-hydroxy-5'octylphenyl)benzotriazole. Specific examples of the alkylolphthalimide compound are methylolphthalimide, ethylolphthalimide, propylolphthal, butylolphthalimide, and octylolphthalimide.

Hence, specific examples of the compound of formula (I) are those composed of an arbitrary combination of the above-described benzotriazole compounds having a phenolic hydroxyl group and alkylolphthalimide compounds. In this case, the bonding position of the phthalimide compound in the product produced by the reaction may be any of the o-, m- and p-positions with respect to the phenolic hydroxyl group of the benzotriazole compound, and the reaction product may be a mixture of compounds differing in this position of bonding.

The terminator of the present invention is used in an amount of from 0.005 to 1 mol, preferably from 0.02 to 0.5 mol, per mol of the dihydric phenol compound. If desired, the compound of formula (I) may be used in combination with conventionally known terminators.

The solvent for the reaction used for the production of the polycarbonate resin includes chlorinated hydrocarbons, e.g., dichloromethane, 1,2-dichloroethane, 1,1,2,2-tetrachloroethane, chloroform, 1,1,1-trichloroethane, carbon tetrachloride, monochlorobenzene, dichlorobenzene, etc.; aromatic hydrocarbons, e.g., benzene, toluene, xylene, ethylbenzene, etc.; and ether compounds, e.g., diethyl ether. These organic solvents may be used either individually or in combinations of two or more thereof. If desired, they may be used in combination with solvents having an affinity for water, such as ethers other than those enumerated above, ketones, esters, and nitriles, as long as the mixed solvent system is not completely compatible with water.

The polymerization catalyst to be used includes tertiary amines, e.g., trimethylamine, triethylamine, tributylamine, tripropylamine, trihexylamine, tridecylamine, N,N-dimethylcyclohexylamine, pyridine, quinoline, dimethylaniline, etc.; and quaternary ammonium salts, e.g., trimethylbenzylammonium chloride, tetramethylammonium chloride, triethylbenzylammonium chloride, etc.

The process of the present invention is essentially carried out by using the above-described components. If desired, the polycarbonate resin of the present invention may be produced by further using from 0.01 to 3 mol %, preferably from 0.1 to 1.0 mol %, of a branching agent based on the dihydric phenol compound, to thereby obtain a branched polycarbonate resin.

Illustrative examples of the branching agent to be used are phloroglucin, 2,6-dimethyl-2,4,6-tri(4-hydroxyphenyl)heptene-3, 4,6-dimethyl-2,4,6-tri(4-hydroxyphenyl)heptene-2, 1,3,5-tri(2-hydroxyphenyl)benzole, 1,1,1-tri(4-hydroxyphenyl)ethane, 2,6-bis(2-hydroxy-5-methylbenzyl)-4-methylphenol, α,α',α"-tri(4-hydroxyphenyl)-1,3,5-triisopropylbenzene, etc.; 2,2-bis(4-hydroxyaryl)oxyindole (isatinbisphenol), 5-chloroisatin, 5,7-dichloroisatin, and 5-bromoisatin.

The polycarbonate resin of the present invention may contain various additives known in the art according to the purpose of use. Examples of such additives are antioxidants, photostabilizers, colorants, organic or inorganic fillers, reinforcements (e.g., carbon fiber, glass fiber), lubricants, and antistatic agents.

The present invention is now illustrated in greater detail by reference to Synthesis Examples, Reference Example, Examples, and Comparative Examples, but it should be understood that the present invention is not deemed to be limited thereto.

SYNTHESIS EXAMPLE 1

5 Kg (20 mol) of 2(2'-hydroxy-3'-aminomethyl-5'-methylphenyl)benzotriazole (HAMB) and 2.9 kg (20 mol) of phthalic anhydride were mixed, and the mixture was melted and stirred at 170° to 180° C. for about 1 hour to conduct reaction. After cooling, the reaction mixture was poured into 30 l of boiling methanol, followed by filtration. The filtrate was allowed to stand overnight to obtain about 5 kg of a pale yellow crystal. The product was identified as the expected compound having formula (a) shown below by elemental analysis.

Elemental Analysis for $C_{22}H_{16}N_4O_3$:
Calcd. (%): C 68.75; H 4.17
Found (%): C 68.70; H 4.22
Formula (a):

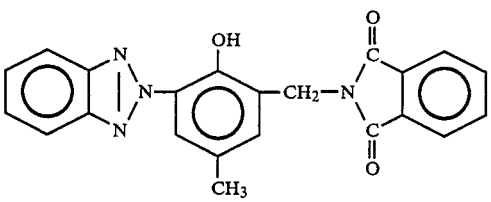

SYNTHESIS EXAMPLE 2

The same procedure of Synthesis Example 1 was repeated, except for replacing HAMB with 5.9 g (20 mol) of (2'-hydroxy-3'-aminomethyl-5'-butylphenyl)benzotriazole. The resulting product was identified as the expected compound having formula (b) shown below by elemental analysis.

Elemental Analysis for $C_{25}H_{22}N_4O_3$:
Calcd. (%): C 70.42; H 5.16
Found (%): C 70.34; H 5.24
Formula (b):

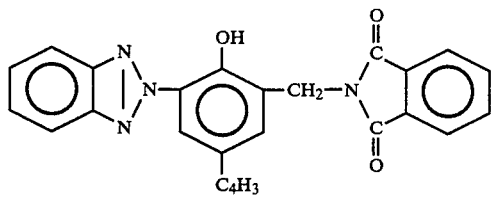

EXAMPLE 1

In 42 l of water was dissolved 2.7 kg of sodium hydroxide, and 7.3 kg of 2,.2-bis(4-hydroxyphenyl)propane (BPA) and 8 g of hydrosulfite were then dissolved in the solution while maintaining at 20° C. To the solution was added 28 l of methylene chloride, and 344 g of the compound of formula (a) as obtained in Synthesis Example 1 was further added thereto while stirring. Then, 3.5 kg of phosgene was blown into the system over a period of 60 minutes. After completion of the blowing, the system was vigorously stirred to emulsify the reaction mixture. After emulsification, 8 g of triethylamine was added thereto, and the stirring was continued for about 1 hour to complete polymerization.

The polymerization mixture was separated into an aqueous phase and an organic phase. The organic phase was neutralized with phosphoric acid and then repeatedly washed with water until the washing became neutral. To the mixture was added 35 of isopropanol to precipitate the polymer, which was then filtered and dried to obtain a polycarbonate resin as a white powder.

Analytical results of the product are shown in Table 1.

EXAMPLE 2

Polycarbonate was produced in the same manner as in Example 1, except for changing the amounts of sodium hydroxide, the compound of formula (a), and phosgene to 4.2 kg, 3.5 kg, and 4.0 kg, respectively.

Analytical results of the resulting polycarbonate are shown in Table 1.

EXAMPLE 3

Polycarbonate was produced in the same manner as in Example 1, except for replacing BPA with 9.3 kg of 1,1-bis(4-hydroxyphenyl)-1-phenylethane (BPAP) and replacing the compound of formula (a) with 450 g of the compound of formula (b) as obtained in Synthesis Example 2.

Analytical results of the polycarbonate are shown in Table 1.

EXAMPLE 4

Polycarbonate was produced in the same manner as in Example 1, except for changing the amounts of sodium hydroxide and phosgene to 4.2 kg and 4.0 kg, respectively, replacing BPA with 8.6 kg of 1,1-bis(4-hydroxyphenyl)cyclohexane (BPZ), and replacing the compound of formula (a) with 2.7 kg of the compound of formula (b).

Analytical results of the polycarbonate are shown in Table 1.

REFERENCE EXAMPLE

Polycarbonate was produced in the same manner as in Example 2, except for replacing the compound of formula (a) with 2.05 kg of a compound of formula (c) shown below.

Analytical results of the polycarbonate are shown in Table 1.

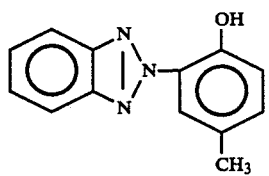

TABLE 1

| Example No. | Dihydric Phenol | Terminator Kind | Terminator Amount (mol %*) | Viscosity Average Mol. Wt. | Weight Loss Initiation Temperature (°C.) |
|---|---|---|---|---|---|
| Example 1 | BPA | (a) | 2.8 | $2.7 \times 10^4$ | 405 |
| Example 2 | BPA | (a) | 28.5 | $0.5 \times 10^4$ | 368 |
| Example 3 | BPAP | (b) | 3.3 | $2.2 \times 10^4$ | — |
| Example 4 | BPZ | (b) | 20.0 | $0.7 \times 10^4$ | — |
| Reference Example | BPA | (c) | 28.5 | $0.5 \times 10^4$ | 334 |

Note: *Based on the dihydric phenol

EXAMPLES 5 TO 7 AND COMPARATIVE EXAMPLES 1 TO 3

A polycarbonate composition having the composition shown in Table 2 below was pelletized by means of an extruder having a screw diameter of 40 mm, and the pellets were injection molded to prepare a test piece having a thickness of 1.6 mm.

Each of the test pieces was subjected to a weathering test by using a sunshine weatherometer ("WEL-SUN-DC Model" manufactured by Suga Shikenki K.K.), and the yellowness index (YI) was measured with an SM color computor ("SM-3-CH Model" manufactured by Suga Shikenki K.K.). The results obtained are shown in Table 2.

TABLE 2

| | Example No. | | | Comparative Example No. | | |
|---|---|---|---|---|---|---|
| | 5 | 6 | 7 | 1 | 2 | 3 |
| Polycarbonate: | | | | | | |
| E-2000*1 | | 98.3 | 83.3 | 100 | 75.0 | 99.5 |
| Example 1 | 100 | | | | | |
| Example 2 | | 1.7 | 16.7 | | | |
| Ref. Example | | | | | 25.0 | |
| Monomer form ultraviolet absorber*2: | | | | | | |
| Kind | (a) | (a) | (a) | | (c) | (c) |
| Amount (wt %) | 4.0 | 0.5 | 5.0 | | 5.0 | 0.5*3 |
| Weather Resistance: | | | | | | |
| Initial YI | 3.6 | 3.5 | 3.7 | 3.4 | 3.8 | 5.7 |
| YI after 100 hrs. exposure | 11.3 | 12.5 | 11.0 | 17.1 | 15.0 | 12.7 |
| ΔYI*4 | 7.7 | 9.0 | 7.3 | 13.7 | 11.2 | 7.0 |

Note:
*1Trade name of a polycarbonate resin produced by Mitsubishi Gas Chemical (viscosity average molecular weight: $2.7 \times 10^4$)
*2The kind and amount of the terminator as regarded as a monomer from the ultraviolet absorber.
*3The amount of the compound (c) added as a monomer.
*4ΔYI=YI after 1000 hrs exposure-Initial YI As described above, the polycarbonate resin produced by the process of the present invention exhibits satisfactory weather resistance equal to that attained by the conventional addition type ultraviolet absorber. Since the terminator having such ultraviolet absorbability is bonded to the terminal of the polycarbonate resin, it undergoes no volatile loss during extrusion or injection molding, and the resin is thus freed from deterioration of mechanical properties or heat stability.

In particular, the polycarbonate oligomer exhibiting the above-described properties as obtained by the process of this invention is also useful for application as a weathering modifier for molding materials for sheets, lenses and coating materials or other resin materials which need to have weather resistance.

While the invention has been described in detail and with reference to specific embodiments thereof, it will be apparent to one skilled in the art that various changes and modifications can be made therein without departing from the spirit and scope thereof.

What is claimed is:

1. A process for producing a weather-resistant polycarbonate resin by solution polymerization of at least one dihydric phenol and phosgene, in which a compound represented by formula (I) is used as a terminator;

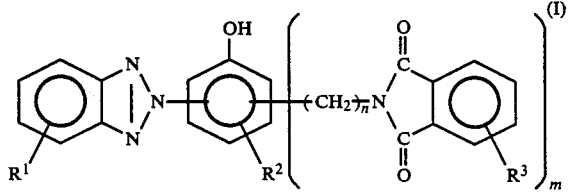

wherein $R^1$, $R^2$, and $R^3$, each represents a hydrogen atom, a halogen atom, a nitro group, an alkyl group having from 1 to 20 carbon atoms, an alkoxy group having from 1 to 20 carbon atoms, or an aryl group having from 6 to 20 carbon atoms; m represents 1 or 2; and n represents an integer of from 1 to 10.

2. A process as claimed in claim 1, wherein said compound is used in an amount of from 0.005 to 1 mol per mol of a dihydric phenol compound used in the solution process.

* * * * *